US006950796B2

(12) United States Patent
Ma et al.

(10) Patent No.: US 6,950,796 B2
(45) Date of Patent: Sep. 27, 2005

(54) SPEECH RECOGNITION BY DYNAMICAL NOISE MODEL ADAPTATION

(75) Inventors: Changxue Ma, Barrington, IL (US); Yuan-Jun Wei, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 614 days.

(21) Appl. No.: 10/007,886

(22) Filed: Nov. 5, 2001

(65) Prior Publication Data

US 2003/0088411 A1 May 8, 2003

(51) Int. Cl.[7] .......................... G10L 15/06; G10L 15/20; G10L 15/14; G10L 21/02
(52) U.S. Cl. ...................... 704/244; 704/233; 704/256; 704/228
(58) Field of Search ................................ 704/244, 233, 704/256, 228

(56) References Cited

U.S. PATENT DOCUMENTS

| | | | | |
|---|---|---|---|---|
| 5,594,834 A | * | 1/1997 | Wang | 704/253 |
| 5,649,057 A | * | 7/1997 | Lee et al. | 704/256 |
| 5,664,059 A | * | 9/1997 | Zhao | 704/254 |
| 5,721,808 A | | 2/1998 | Minami et al. | |
| 5,956,679 A | | 9/1999 | Komori et al. | |
| 5,960,395 A | * | 9/1999 | Tzirkel-Hancock | 704/241 |
| 5,970,446 A | * | 10/1999 | Goldberg et al. | 704/233 |
| 6,026,359 A | | 2/2000 | Yamaguchi et al. | |
| 6,076,057 A | * | 6/2000 | Narayanan et al. | 704/256 |
| 6,078,884 A | * | 6/2000 | Downey | 704/243 |
| 6,108,610 A | * | 8/2000 | Winn | 702/77 |
| 6,131,089 A | * | 10/2000 | Campbell et al. | 706/20 |
| 6,188,982 B1 | | 2/2001 | Chiang | |
| 6,418,411 B1 | * | 7/2002 | Gong | 704/256 |
| 6,772,117 B1 | * | 8/2004 | Laurila et al. | 704/233 |
| 6,778,959 B1 | * | 8/2004 | Wu et al. | 704/256 |
| 2001/0025276 A1 | | 9/2001 | Pao | |
| 2002/0062212 A1 | * | 5/2002 | Nakatsuka | 704/240 |

OTHER PUBLICATIONS

Reichl et al., "Discriminative Training for Continuous Speech Recognition", Eurospeech–95, Madrid, Spain, Sep. 1995, pp. 537–540.*

* cited by examiner

Primary Examiner—David L. Ometz
Assistant Examiner—Brian L Albertalli (57) ABSTRACT

The invention provides a Hidden Markov Model (132) based automated speech recognition system (100) that dynamically adapts to changing background noise by detecting long pauses in speech, and for each pause processing background noise during the pause to extract a feature vector that characterizes the background noise, identifying a Gaussian mixture component of noise states that most closely matches the extracted feature vector, and updating the mean of the identified Gaussian mixture component so that it more closely matches the extracted feature vector, and consequently more closely matches the current noise environment. Alternatively, the process is also applied to refine the Gaussian mixtures associated with other emitting states of the Hidden Markov Model.

18 Claims, 4 Drawing Sheets

SPEECH RECOGNITION BY DYNAMICAL NOISE MODEL ADAPTATION

FIELD OF THE INVENTION

This invention pertains to automated speech recognition. More particularly this invention pertains to speaker independent speech recognition suitable for varied background noise environments.

BACKGROUND OF THE INVENTION

Recently as the processing power of portable electronic devices has increased there has been an increased interest in adding speech recognition capabilities to such devices. Wireless telephones that are capable of operating under the control of voice commands have been introduced into the market. Speech recognition has the potential to decrease the effort and attention required of users operating wireless phones. This is especially advantageous for users that are frequently engaged in other critical activities (e.g., driving) while operating their wireless phones.

The most widely used algorithms for performing automated speech recognition (ASR) are based on Hidden Markov Models (HMM). In a HMM ASR speech is modeled as a sequence of states. These states are assumed to be hidden and only output based on the states, i.e. speech is observed. According to the model, transitions between these states are governed by a matrix of transition probabilities. For each state there is an output function, specifically a probability density function that determines an a posteriori probability that the HMM was in the state, given measured features of an acoustic signal. The matrix of transition probabilities, and parameters of the output functions are determined during a training procedure which involves feeding known words, and or sentences into the HMM ASR and fine tuning the transition probabilities and output function parameters to achieve optimized recognition performance.

In order to accommodate the variety of accents and other variations in the way words are pronounced, spoken messages to be identified using a HMM ASR system are processed in such a manner as to extract feature vectors that characterize successive periods of the spoken message.

In performing ASR a most likely sequence of the states of the HMM is determined in view of the transition probability for each transition in the sequence, the extracted feature vectors, and the a posteriori probabilities associated with the states.

Background noise, which predominates during pauses in speech, is also modeled by one or more states of the HMM model so that the ASR will properly identify pauses and not try to construe background noise as speech.

One problem for ASR systems, particularly those used in portable devices, is that the characteristics of the background noise in the environment of the ASR system is not fixed. If an ASR system is trained in an acoustic environment where there is no background noise, or in an acoustic environment with one particular type of background noise, the system will be prone to making errors when operated in an environment with background noise of different type. Different background noise that is unfamiliar to the ASR system may be construed as parts of speech.

What is needed is a ASR system that can achieve high rates of speech recognition when operated in environments with different types of background noise.

What is needed is a ASR system that can adapt to different types of background noise.

BRIEF DESCRIPTION OF THE DRAWINGS

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Figure 1:
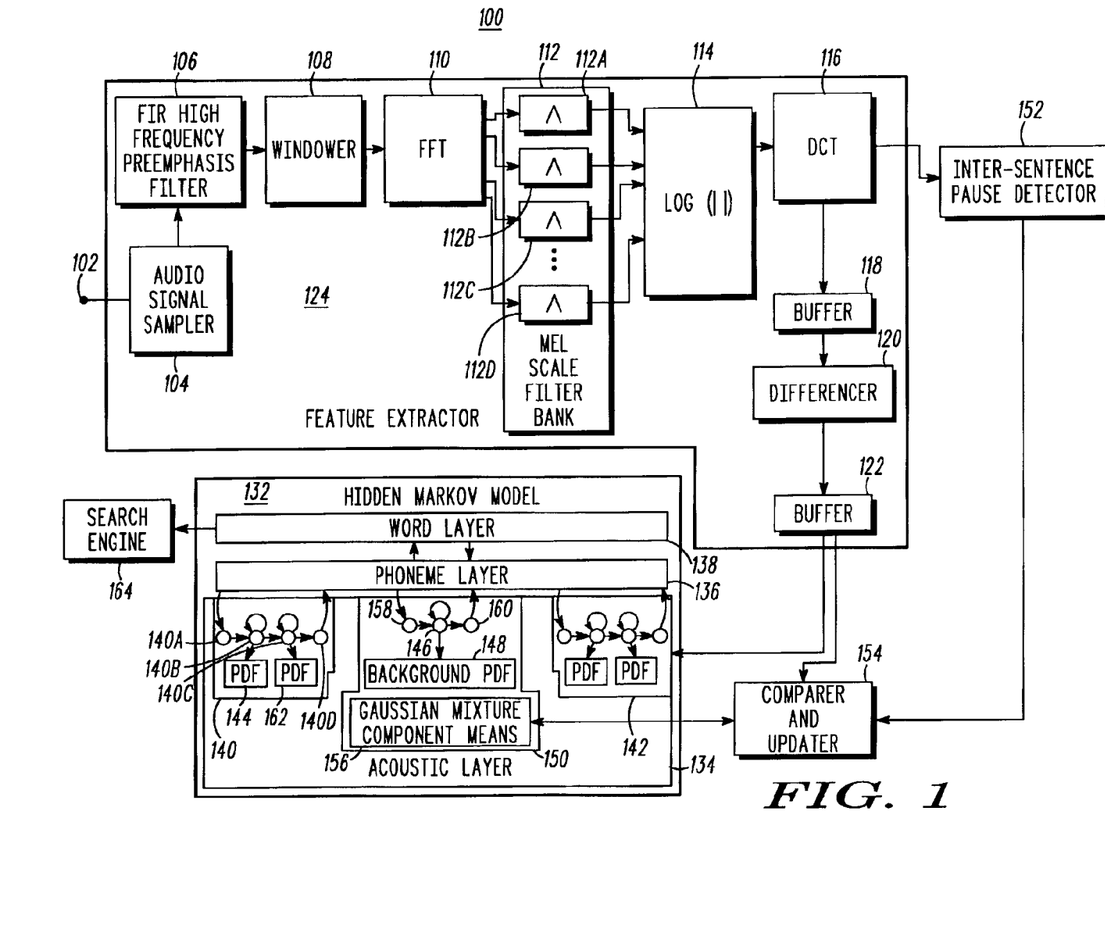
FIG. 1 is a functional block diagram of a system for performing automated speech recognition according to the preferred embodiment of the invention.

FIG. 1 is a functional block diagram of a system 100 for performing automated speech recognition according to the preferred embodiment of the invention. Audio signals from a transducer (e.g., microphone, not shown) are input at and an input 102 of an audio signal sampler 104. The audio signal sampler 104 preferably samples the audio signal at a sampling rate of about 8,000 to 16,000 samples per second and at 8 to 16 bit resolution and outputs a representation of the input audio signal that is discretized in time and amplitude. The audio signals may be represented as a sequence of binary numbers:

$X_n$, n=0 ... N, where $X_n$ is an nth indexed digitized sample, and
the index n ranges up to a limit N determined by the length of the audio signal.

A Finite Impulse Response (FIR) time domain filter 106 is coupled to the audio signal sampler 104 for receiving the discretized audio signal. The FIR filter 106 serves to increase the magnitude of high frequency components compared to low frequency components of the discretized audio signal. The FIR time domain filter 106 processes the discretized audio signal and outputs a sequence of filtered discretized samples at the sampling rate. The each nth filter output may be expressed as:

$$X_n^t = \sum_{k=0}^{M} C_k X_{n-k}$$

where $X_n^t$ is an nth time domain filtered output,
$C_k$ is a kth FIR time domain filter coefficient,
M is one less than the number of FIR time domain coefficients; and $X_{n-k}$ is an indexed digitized sample received from the audio signal sampler 104.

Preferably, M is equal to 1, $C_0$ is about equal to unity and $C_1$ is about equal to negative 0.95. Other suitable filter functions may be used for pre-emphasizing high frequency components of the discretized audio signal.

A windower 108 is coupled to the FIR filter 106 for receiving the filtered discretized samples. The windower 108 multiplies successive subsets of filtered discretized samples by a discretized representation of a window function. For example each subset that is termed a frame may comprise about 25 to 30 ms of speech. (about 200 to 480 samples). Preferably, there is about a 15–20 ms overlaps between the two successive blocks. Each filtered discretized sample in each frame is multiplied by a specific coefficient of the window function that is determined by the position of the filtered discretized sample in the window. The windower 108 preferably outputs windowed filtered speech samples at an average rate equal to the inverse of the difference between length of each frame and the overlap between frames. Each windowed filtered sample within a frame may be denoted:

$$X_n^F = X_n^t W_n$$

where the index n now denotes position within a frame;
the index F denotes a frame number;
$X_n^F$ is a nth windowed filtered sample; and
$W_n$ is a window coefficient corresponding to the nth position within each frame.

Applying the windowing function to the discretized audio signal, aids in reducing spectral overlap between adjacent frequency components that are output by a Fast Fourier Transform FFT 110. A Hamming window function is preferred.

The FFT 110 is coupled to the windower 108 for receiving the successive frames of windowed filtered samples. The FFT projects successive frames of windowed filtered discretized audio signal samples onto a Fourier frequency domain basis to obtain and outputs a plurality of audio signal Fourier frequency components, and processes the Fourier frequency components to determine a set of power Fourier frequency component for each frame. The FFT 110 outputs a sequence of power Fourier components. The power FFT components are given by the following relations:

$$P(0) = \frac{1}{N^2}|C_0|^2$$

$$P(f_k) = \frac{1}{N^2}[|C_k|^2 + |C_{N-k}|^2]$$

$$P(f_{N/2}) = \frac{1}{N^2}|C_{N/2}|^2$$

where, P(0) is a zero order power Fourier frequency component (equal to an average of power of a frame);
P($f_l$) is an lth power Fourier frequency component of the frame;
N is the number of samples per frame; and $$C_k = \sum_{n=0}^{N-1} X_n^F e^{2\pi i n k/N} \quad k = 0, \ldots, N-1$$

where $C_K$ is a kth Fourier frequency component;
i is the square root of negative one;
n is a summation index;
N−1 is the number of samples per frame A MEL scale filter bank 112 is coupled to the FFT 110 for receiving the power Fourier frequency components. The MEL scale filter bank includes a plurality of MEL scale band pass filters 112A, 112B, 112C, 112D (four of which are shown). Each MEL scale band pass filter preferably is a weighted sum of a plurality of power Fourier frequency components. The MEL scale band pass filters 112A–112D preferably have a triangular profile in the frequency domain. Alternatively, the MEL scale bandpass filters 112A–112D have Hamming or Hanning frequency domain profile. Each MEL bandpass filter 112A–112D preferably integrates a plurality of power Fourier frequency components into a MEL scale frequency component. By integrating plural power Fourier frequency components with the MEL bandpass filters 112A–112D the dimensionality of the audio signal information is reduced. The MEL scale bands are chosen in view of understood characteristics of human acoustic perception. There are preferably about 10 evenly spaced MEL scale bandpass filters below 1 KHz. Beyond 1 KHz the bandwidth of successive MEL frequency bandpass filters preferably increase by a factor of about 1.2. There are preferably about 10 to 20 MEL scale bandpass filters above 1 KHz, and more preferably about 14. The MEL scale filter bank 112 outputs a plurality of MEL scale frequency components. An mth MEL scale frequency component of the MEL scale filter bank 112 corresponding to an mth MEL bandpass filter is denoted Z(m).

A log-magnitude evaluator 114 is coupled to the MEL scale frequency filter bank 112 for applying a composite function to each MEL scale frequency component. The composite function comprises taking the magnitude of each MEL scale frequency component, and taking the log of the result. By taking the magnitude of each MEL scale frequency component, phase information, which does not encode speech information, is discarded. By discarding phase information, the dimensionality of acoustic signal information is further reduced. By taking the log of the resulting magnitude the magnitudes of the MEL scale frequency components are put on a scale which more accurately models the response of the human hearing to changes in sound intensity. The log-magnitude evaluator 114 outputs a plurality of rescaled magnitudes of the MEL scale frequency components of the form log(|Z(m)|).

A discrete cosine transform block (DCT) 116 is coupled to the log absolute value taker 114 for receiving the rescaled magnitudes. The DCT 116 transforms the rescaled magnitudes to the time domain. The output of the DCT 116 comprises a set of DCT components values (cepstral coefficients) for each frame. The zero order component output by the DCT is proportional to the log energy of the acoustic signal during the frame from which the component was generated. The DCT components output by the DCT 116 are preferably of the following form:

$$y^P(k) = \sum_{m=1}^{M} \log(|Z(m)|) \cos\left(k\left(m - \frac{1}{2}\right)\frac{\pi}{M}\right)$$

where $y^P(k)$ is a kth order DCT component output by the DCT 116 for a pth frame; and
M in this case is the number of MEL scale frequency components.

The summation on the left hand side of the above equation effects the DCT transformation. The DCT components are also termed cepstrum coefficients.

The windower 108, FFT 110, MEL scale filter bank 112, log-magnitude evaluator 114, and DCT 116 operate in synchronism. The DCT 116 sequentially outputs sets of DCT components corresponding to frames of discretized samples output by the windower 108.

A first buffer 118 is coupled to the DCT 116 for receiving successive sets of DCT component values. A differencer 120 is coupled to the first buffer 118 for receiving successive sets of DCT component values. The differencer 120 operates on two or more successive sets of component values by taking the difference between corresponding DCT component values from different sets and outputting sets of discrete differences (including one difference for each DCT component) of first and/or higher order, for each frame. The discrete differences characterize the time-wise variation of the DCT component values. The lth order discrete time difference for the pth frame $\Delta^l(y^P(k))$ applied to the sequence of DCT components is given by the following recursion relations:

$$\Delta^l(y^P(k)) = \Delta^{l-1}(y^{P+1}(k)) - \Delta^{l-1}(y^{P-1}(k))$$

$$\Delta^0(y^P(k)) = y^P(k)$$

The DCT component values output for each frame by the DCT 116, along with discrete differences of one or more orders serve to characterize the audio signal during each frame. (The DCT component values and the discrete differences are numbers.) The DCT component values and discrete differences of one or more orders are preferably stored in arrays (one for each frame) and treated as vectors, hereinafter termed feature vectors. Preferably, DCT components and the first two orders of differences are used in the feature vectors. The feature vectors for a given frame P are denoted:

$$Y^P = [Y_1^P, Y_2^P, Y_3^P, \ldots Y_K^P \ldots Y_D^P]$$

where the first k vector elements are DCT components, and the (k+1)th through Dth vector elements are discrete differences of the DCT components.

According to an alternative embodiment the differencer 120 is eliminated, and only the DCT components are used to characterize the audio signal during each frame.

The first buffer 118, and the differencer 120 are coupled to a second buffer 122. The feature vectors are assembled and stored in the second buffer 122.

The above described functional blocks including the audio signal sampler 104, FIR time domain filter 106, windower 108, FFT 110, MEL scale filter bank 112, log-magnitude evaluator 114, DCT 116, first buffer 118, differencer 120, and second buffer 122, are parts of a feature extractor 124. The function of the feature extractor 124 is to eliminate extraneous, and redundant information from audio signals that include speech sounds, and produce feature vectors each of which is highly correlated to a particular sound that is one variation of a component of spoken language. Although a preferred structure and operation of the feature extractor 124 has been described above, other types of feature extractor that have different internal structures, and/or operate differently to process audio signals that include speech sounds, and produce by such processing characterizations of different sub parts (e.g., frames) of the audio signal may be used in practicing the invention.

The second buffer 122 supplies feature vectors for each frame to a Hidden Markov Model (HMM) 132. The HMM 132 models spoken language. The HMM 132 comprises a hierarchy of three interconnected layers of states including an acoustic layer 134, a phoneme layer 136, and a word layer 138. The word layers 138 includes a plurality of states corresponding to a plurality of words in a vocabulary of the HMM. Transitions between states in the word layer are governed by a word layer transition matrix. The word layer transition matrix includes a probability for each possible transition between word states. Some transition probabilities may be zero.

The phoneme layer 136 includes a word HMM for each word in the word layer 138. Each word HMM includes a sequence of states corresponding to a sequence of phonemes that comprise the word. Transitions between phoneme states in the word layer are also governed by a matrix of transition probabilities. There may be more than one word HMM for each word in the word layer 138.

Finally, the acoustic layer 134 includes a phoneme HMM model of each phoneme in the language that the HMM 132 is capable of recognizing. Each phoneme HMM includes beginning states and ending states. A first phoneme HMM model 140 and second phoneme HMM model 142 are illustrated. In actuality, there are many phoneme HMM models in the acoustic layer 134. The details of phoneme HMM models will be discussed with reference to the first phoneme HMM model 140. A beginning state 140A and an ending states 140D are non-emitting which is to say that these states 140A, 140D are not associated with acoustic features. Between the beginning and ending states of each phoneme HMM are a number of acoustic emitting states (e.g., 140B, 140C). Although two are shown for the purpose of illustration, in practice there may be more than two emitting states in each phoneme model. Each emitting state of each phoneme HMM model (e.g., 140) is intended to correspond to an acoustically quasi stationary frame of a phoneme. Transitions between the states in each phoneme model are also governed by a transition probability matrix.

The acoustic layer also includes an HMM model 156 for the absence of speech sounds that occur between speech sounds (e.g., between words, and between sentences). The model for the absence of speech sounds 156 (background sound model) 156 is intended to correspond to background noise which predominates in the absence of speech sounds. The background sound model 156 includes a first state 158 that is non-emitting, and a final state 160 that is non-emitting. An emitting state 146 is located between the first 158 and final 160 states. The emitting state 146 represents background sounds. As mentioned above a difficulty arises in ASR due to the fact that the background noise varies.

Feature vectors that characterizes the audio signal that are output by the feature extractor 124 are input into the HMM 132 and used within the acoustic layer 134. Each emitting state in the acoustic layer 134 has associated with it a probability density function (PDF) which determines the a posteriori probability that the acoustic state occurred given the feature vector. The emitting states 140B and 140C of the first phoneme HMM have associated probability density functions 144 and 162 respectively. Likewise, the emitting state 146 of the background sound model 156 has a background sound PDF 148. Gaussian mixture component means for the background sound model 156, that uses Gaussian mixture component means 150 that are described below.

The a posteriori probability for each emitting state (including the emitting state 146 in the background sound model 150) is preferably a multi component Gaussian mixture of the form:

$$b_j(Y^P) = \sum_{n=1}^{M} c_j^n b_j^n(Y^P)$$

where, $b_j(Y^P)$ is the a posteriori probability that the HMM model 132 was in a jth state during frame P given the fact that the audio signals during frame P was characterized by a feature vector $Y^P$;

$c_j^n$ is a mixture component weight; and $b_j^n(Y^P)$ is an nth mixture component for the jth state that is given by:

$$b_j^n(Y^P) = \frac{1}{\sqrt{(2\pi)^P \prod_{i=1}^{D} \sigma_{ijn}^2}} \exp\left\{-\frac{1}{2}\sum_{i=1}^{D} \frac{(Y_i^P - \mu_{ijn})^2}{\sigma_{ijn}}\right\}$$

where, $\mu_{ijn}$ is a mean of an ith parameter (corresponding to an ith elements of the feature vectors), of the nth mixture component of the jth acoustic state 132 (for a phoneme or for background sounds) of the HMM model.

$\sigma_{ijn}$ is a variance associated with the ith parameter of the nth mixture component of the jth acoustic state of the acoustic layer.

The means $\mu_{ijn}$ serve as reference characterizations of a sound modeled by the a posteriori probability.

In the operation a seach engine 164 searches the HMM 132, for one or more sequences of states that are characterized by high probabilities, and outputs one or more sequences of words that correspond to the high probability sequences of states. The probability of sequences of states are determined by the product of transition probabilities for the sequence of states multiplied by the a posteriori probabilities that the sequence of states occurred based on their associated a posteriori probabilities in view of a sequence of feature vectors extracted from the audio signal to be recognized. The a posteriori probabilities evaluating the a posteriori probabilities associated with a sequence of postulated states with an extracted sequence of feature vectors. Expressed mathematically the probability of a sequence of states $S^{1 \cdots T}$ given the fact that a sequence of feature vectors $Y^{1 \cdots T}$ was extracted from the audio signal is given by:

$$P(S^{1\cdots T}, Y^{1\cdots T}, \Theta) = \pi_{s_1} b_{s_1}(Y^1) \prod_{t=2}^{T} a_{S_{t-1}S_t} b_{S_t}(Y^t)$$

where $\Theta$ specifies the underlying HMM model;
$\pi_{s_1}$ specifies the probability of a first postulated state in the sequence of states.;
$a_{S_{t-1}S_t}$ specifies the probability of a transition between a first state postulated for a first time t-1 and second state postulated for the successive time t; and
other quantities are defined above.

Various methods are know to persons of ordinary skill in the ASR art for finding a likely sequence of states without having to exhaustively evaluate the above equation for each possible sequence of states. One known method is the Viterbi search method.

In the HMM 132, transitions from various phoneme states to the model for the absence of speech sounds are allowed. Such transitions often occur at the end of postulated words. Thus, in order to be able to determine the ending of words, and in order to be able to discriminate between short words that sound like the beginning of longer words and the longer words, it is important to be able to recognize background sounds.

In training an HMM based ASR system that includes a model of non-speech sounds, certain parameters that described the non speech background sounds must be set. For example if an a posterior probability of the form shown above is used then the mixture component weights, the means $\mu_{ijn}$ and the variances $\sigma_{ijn}$ that characterize background sound must be set during training. As discussed in the background section characteristics of the background sound are not fixed. If a portable device that includes an HMM ASR system is taken to different locations the characteristics of the background sound is likely to change. When the background sound in use differs from that present during training, the HMM ASR is more likely to make errors.

According to the present invention a model used in the ASR, preferably the model of non-speech background sounds is updated frequently while the ASR is in regular use. The model of non-speech background sounds is updated so as to better model current background sounds. According to the present invention, the background sound is preferably measured in the absence of speech sounds, e.g., between words or sentences. According to the preferred embodiment of the invention the updating takes place during breaks of at least 600 milliseconds, e.g. breaks that occur between sentences.

According to the preferred embodiment of the invention, the detection of the absence of voiced sounds is premised on the assumption that speech sounds reaching the input 102 of the ASR system 100 have greater power than background sounds. According to the preferred embodiment of the invention the interruptions in speech sounds between sentences are detected by comparing the zero order DCT coefficient of each frame which represents the log energy of each frame to a threshold, and requiring that the zero order DCT coefficient remain below the threshold for a predetermined period. By requiring that the zero order DCT coefficient remain below the threshold it is possible to distinguish longer inter sentence breaks in speech sound from shorter intra sentence breaks. According to an alternative embodiment of the invention an absence of speech sounds is detected by comparing a weighted sum of DCT coefficients to a threshold value. The threshold may be set dynamically based on a running average of the power of the audio signal.

An inter sentence pause detector 152 is coupled to the DCT 116 for receiving one or more of the coefficients output by the DCT for each frame. Preferably, the inter-sentence pause detector receives the zero order DCT coefficient (log energy value) for each frame. If the zero order DCT, (Alternatively, a sum of DCT coefficients, or a weighted sum of the DCT coefficients) remains below a predetermined threshold value for a predetermined time and then goes above the threshold, the inter sentence pause detector 152 outputs a trigger signal. The predetermined time is set to be longer than the average of intra sentence pauses. The trigger signal is output at the end of long (inter sentence) pauses. According to the preferred embodiment of the invention adjustment of the non speech sound model is based on background sounds that occur near the end of inter sentence breaks in speech sound. Note that inter sentence pause detector 152 may be triggered after long breaks (e.g., 15 minutes) in speech sounds A comparer and updater 154 is coupled to the inter-sentence pause detector for receiving the trigger signal. The comparer and updater 154 also coupled to the second buffer 122 for receiving feature vectors. In response to receiving the trigger signal the comparer and updater 154 reads one or more feature vectors that were extracted from the end of the inter sentence pause from the second buffer 122. Preferably, more than one feature vector is read from the second buffer 122 and averaged together element by element to obtain a characteristic feature vector (CRV) that corresponds to at least a portion of the inter sentence pause. Alternatively a weighted sum of feature vectors from the inter sentence pause is used. Weights used in the weighted sum may be coefficients of a FIR low pass filter. According to another alternative embodiment of the invention the weighted sum may sum feature vectors extracted from multiple inter sentence pauses (excluding speech sounds between them). Alternatively, one feature vector extracted from the vicinity of the end of the inter sentence pause is used as the characteristic feature vector. Once the characteristic feature vector has been obtained, a mean vector, from among a plurality mean vectors of one or more emitting states of the background sound model, that is closest to the characteristic feature vector is determined. The closest mean is denoted $$\mu_{jn}{}^* = [\mu_{1jn}, \mu_{1jn}, \mu_{1jn}, \ldots \mu_{ijn}, \ldots \mu_{Djn}]$$

The closest mean belongs to an nth mixture component of a jth state.

Closeness is preferably judged by determining which mixture component assumes the highest value when evaluated using the characteristic feature vector. Alternatively, closeness is judged by determining which mean vector $\mu_{jn}$ yields the highest dot product with the characteristic feature vector. According to another alternative, closeness is judged by evaluating the Euclidean vector norm distance between the characteristic feature vector and each mean vector $\mu_{jn}$ and determining which distance is smallest. The invention is not limited to any particular way of determining the closeness of the characteristic feature vector to the mean vectors $\mu_{jn}$ of the Gaussian mixture components. Once the closest mean vector is identified, the mixture component with which it is associated is altered so that it yields a higher a posteriori probability when evaluated with the characteristic feature vector. Preferably, the latter is accomplished by altering the identified closest mean vector so that it is closer to the characteristic feature vector. More preferably the alteration of the identified closest mean vector $\mu_{jn}{}^*$ is performed using the following transformation equation:

$$\mu_{jn}{}^{new} = (1-\alpha)\mu_{jn}{}^* \alpha * CRV$$

where $\mu_{jn}{}^{new}$ is a new mean vector to replace the identified closest mean vector $\mu_{jn}{}^*$ $\alpha$ is a weighting parameter that is preferably at least about 0.7 and more preferably at least about 0.9; and CRV is the characteristic feature vector for non speech background sounds as measured during the inter sentence pause.

Thus as a user continues to use the ASR system 100 as the background sounds in the environment of the ASR system 100 change, the system 100 will continue to update one or more of the means of the Gaussian mixtures of the non speech sound emitting state, so that the at least one component of the Gaussian mixtures better match the ambient noise. Thus the ASR system 100 will be better able to identify background noise, and the likelihood of the ASR system 100 construing background noise 100 as a speech phoneme will be reduced. Ultimately, the recognition performance of the ASR system is improved.

The ASR system 100 may be implemented in hardware or software or a combination of the two.

Figure 2:
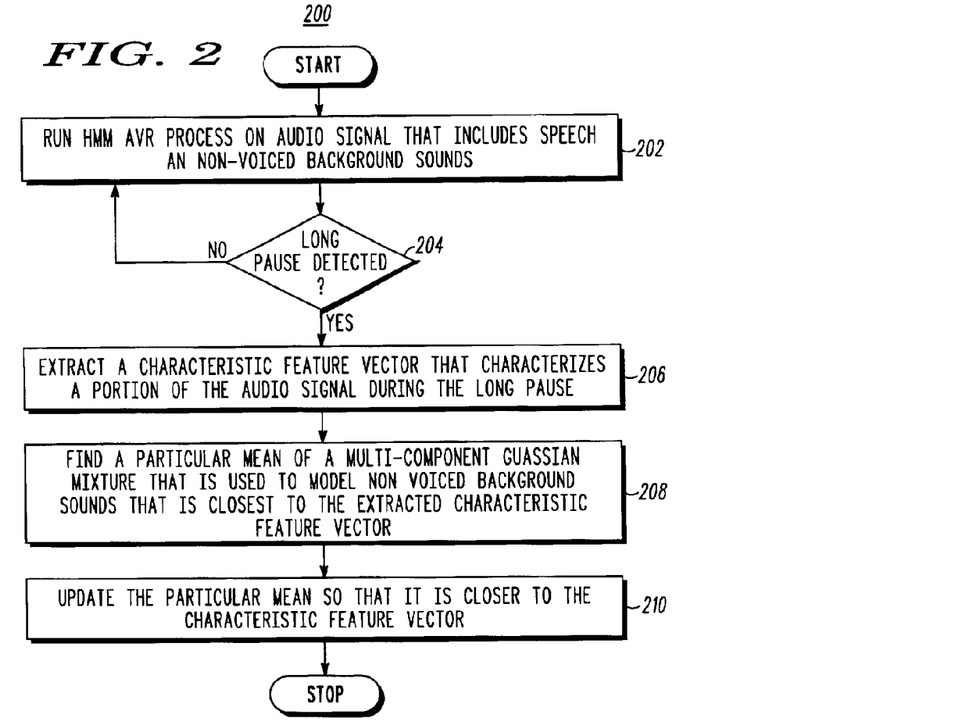
FIG. 2 is a flow chart of a process for updating a model of background noise according to the preferred embodiment of the invention.

FIG. 2 is a flow chart of a process 200 for updating a model of background noise according to the preferred embodiment of the invention. Referring to FIG. 2, in process block 202 an HMM ASR process is run on an audio signal that includes speech and non speech background sounds. Block 202 is decision block that depends on whether a long pause in the speech component of the audio signal is detected. If a long pause is not detected then the process 200 loops back to block 204 and continues to run the HMM ASR process. If a long pause is detected, the process continues with process block 206 in which a characteristic feature vector that characterizes the audio signal during the long pause (i.e., characterizes the background sound) is extracted from the audio signal. After process block 206, in process block 208 a particular mean of a multi-component Gaussian mixture that is used to model non speech background sounds that is closest to the characteristic feature vector extracted in block 206 is found. In process block 210 the particular mean found in process block 208 is updated so that it is closer to the characteristic feature vector extracted in block 206. From block 210 the process 200 loops back to block 202.

Figure 3:
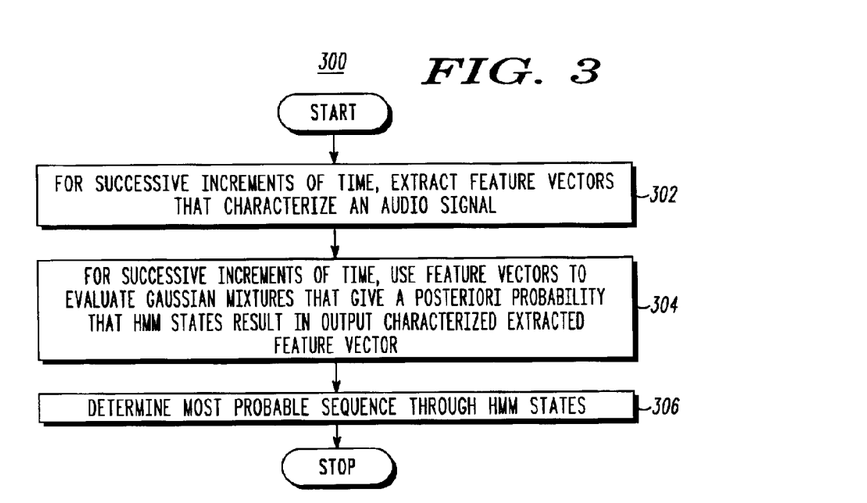
FIG. 3 is a high level flow chart of a process of performing automated speech recognition using a Hidden Markov Model.

FIG. 3 is a high level flow chart of a process 300 of performing automated speech recognition using an HMM. FIG. 3 is a preferred form of block 202 of FIG. 2. In process block 302 for each successive increment of time (frame) a feature vector that characterizes an audio signal is extracted. In process block 304 for each successive increment of time, the feature vector is used to evaluate Gaussian mixtures that give the a posteriori probabilities that various states of the HMM result in audio signal characterized by the feature vector. In process block 306 the most probable sequence of HMM states is determined in view of the a posteriori probabilities and transition probabilities that govern transitions between the HMM states. For each subsequent frame i.e., as speech continues to be processed, the most probable sequence of HMM states is updated. A variety of methods of varying computational complexity are known to persons of ordinary skill in the ASR art for finding the most probable sequence of HMM states.

Figure 4:
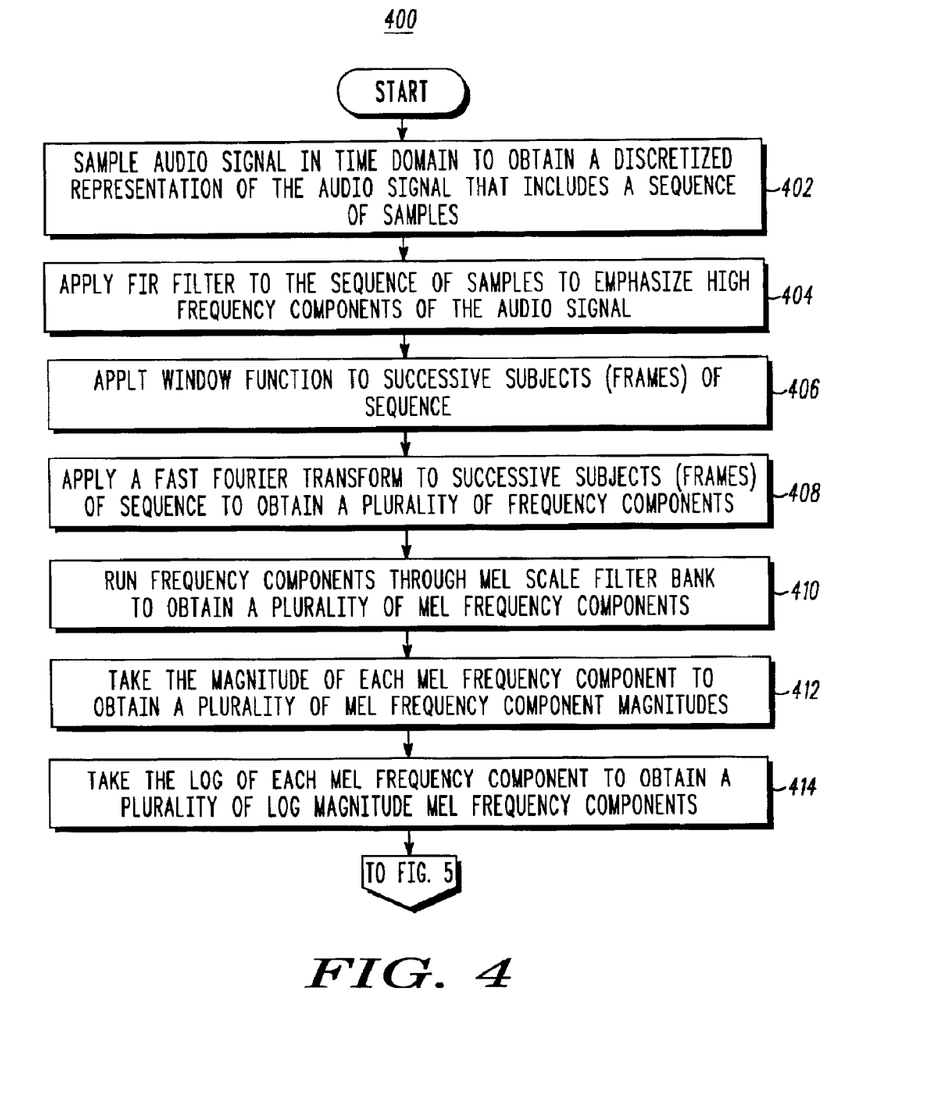
FIG. 4 is a first part of flow chart of a process for extracting feature vectors from an audio signal according to the preferred embodiment of the invention.
Figure 5:
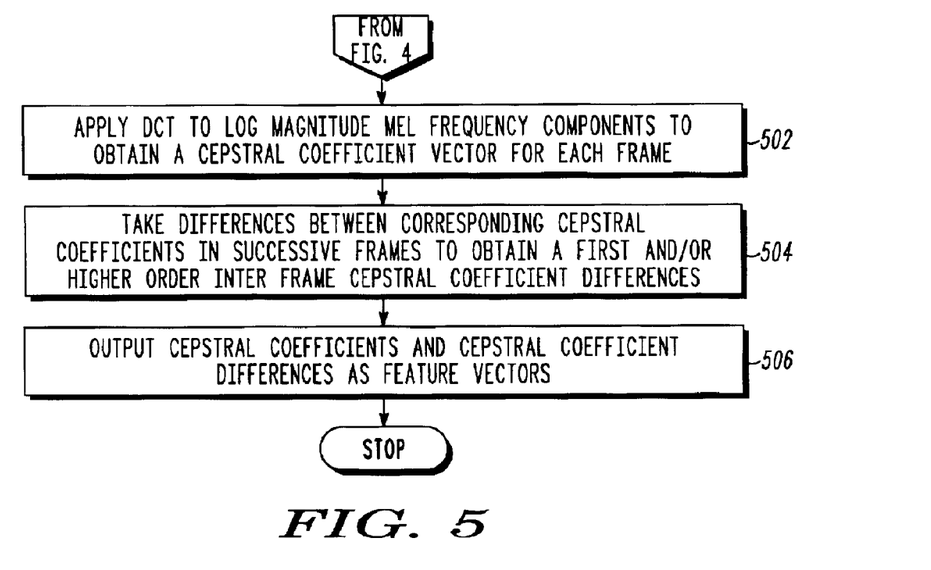
FIG. 5 is a second part of the flow chart begun in FIG. 4.

FIG. 4 is a first part of flow chart of a process 400 for extracting feature vectors from an audio signal according to the preferred embodiment of the invention. FIGS. 4 and 5 show a preferred form of block 302 of FIG. 3. In step 402 an audio signal is sampled in the time domain to obtain a discretized representation of the audio signal that includes a sequence of samples. In step 404 a FIR filter is applied to the sequence of samples to emphasize high frequency components. In step 406 a window function is applied to successive subsets (frames) of the sequence of samples. In step 408 a FFT is applied to successive frames of samples to obtain a plurality of frequency components. In step 410 the plurality of frequency components are run through a MEL scale filter bank to obtain a plurality of MEL scale frequency components. In step 412 the magnitude of each MEL scale frequency component is taken to obtain a plurality of MEL frequency component magnitudes. In step 414 the log of each MEL frequency component magnitude is taken to obtain a plurality of log magnitude MEL scale frequency components. Referring to FIG. 5 which is a second part of the flow chart begun in FIG. 4, in step 502 a DCT is applied to the log magnitude MEL scale frequency components for each frame to obtain a cepstral coefficient vector for each frame. In step 504 first or higher order differences are taken between corresponding cepstral coefficients for two or more frames to obtain at least first order inter frame cepstral coefficient differences (deltas). In step 506 for each frame the cepstral coefficients and the inter frame cepstral coefficient differences are output as a feature vector.

Figure 6:
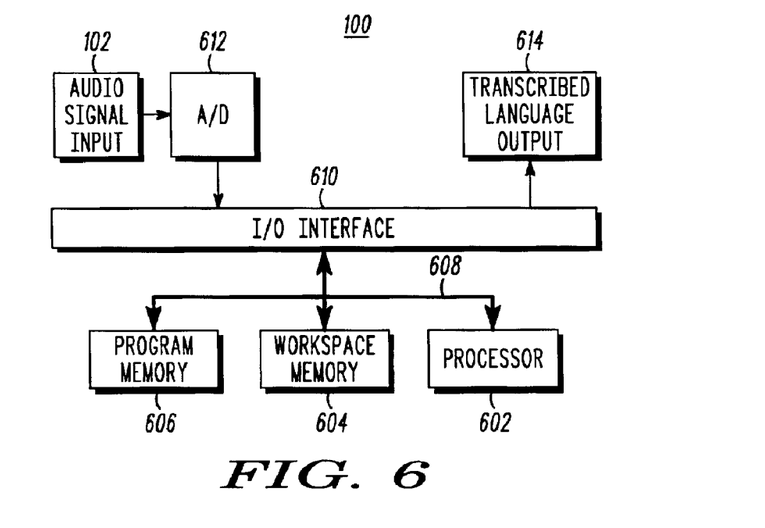
FIG. 6 is a hardware block diagram of the system for performing automated speech recognition according to the preferred embodiment of the invention.

FIG. 6 is a hardware block diagram of the system 100 for performing automated speech recognition according to the preferred embodiment of the invention. As illustrated in FIG. 6, the system 100 is a processor 602 based system that executes programs 200, 300, 400 that are stored in a program memory 606. The program memory 606 is a form of computer readable medium. The processor 602, program memory 606, a workspace memory 604, e.g. Random Access Memory (RAM), and input/output (I/O) interface 610 are coupled together through a digital signal bus 608. The I/O interface 610 is also coupled to an analog to digital converter (A/D) 612 and to a transcribed language output 614. The A/D 612 is coupled to the audio signal input 102 that preferably comprises a microphone. In operation the audio signal is input at the audio signal input 102 converted to the above mentioned discretized representation of the audio signal by the A/D 612 which operates under the control of the processor 602. The processor executes the programs described with reference to FIGS. 2–5 and outputs a stream of recognized sentences through the transcribed language output 614. Alternatively the recognized words or sentences are used to control the operation of other programs executed by the processor. For example the system 100 may comprise other peripheral devices such as wireless phone transceiver (not shown), in which case the recognized words may be used to select a telephone number to be dialed automatically. The processor 602 preferably comprises a digital signal processor (DST). Digital signal processors have instruction sets and architectures that are suitable for processing audio signal.

As will be apparent to those of ordinary skill in the pertinent arts, the invention may be implemented in hardware or software or a combination thereof. Programs embodying the invention or portions thereof may be stored on a variety of types of computer readable media including optical disks, hard disk drives, tapes, programmable read only memory chips. Network circuits may also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of performing automatic speech recognition in a variable background noise environment, the method comprising the steps of:

processing a first portion of an inter-sentence pause to obtain a first characterization of the first portion of the inter-sentence pause;

comparing the first characterization to a set of non-speech audio characterizations to determine a particular non-speech audio characterization among the set of non-speech audio characterizations that most closely matches the first characterization;

generating an updated set of non-speech characterizations by updating the particular non-speech audio characterization so that the particular non-speech audio characterization more closely resembles the first characterization.

2. The method according to claim 1 further comprising the step of:

detecting the inter-sentence pause.

3. The method according to claim 1 wherein:

the step of processing the first portion of the inter-sentence pause to obtain a first characterization includes a sub-step of:

processing the first portion of the inter-sentence pause to obtain a first set of numbers that characterize the first portion of the inter-sentence pause; and the step of comparing the first characterization to a set of non-speech audio characterizations comprises the sub-steps of:

comparing the first set numbers to a plurality of non-speech audio sets of numbers to determining a particular set of non-speech audio numbers that most closely matches the first set of numbers.

4. The method according to claim 3 wherein the step of updating the non-speech audio characterization comprises the sub-steps of:

replacing each number in the particular set of numbers with a weighted average of the number and a corresponding number in the first set of numbers.

5. The method according to claim 4 wherein the step of comparing the first characterization to a set of non-speech audio characterizations comprises the sub-steps of:

taking a dot product between the first set of numbers and each of the plurality of non-speech audio sets of numbers.

6. The method according to claim 5 wherein the plurality of non-speech audio sets of numbers are means of components of Gaussian mixtures that characterize the probability of an underlying state of a hidden Markov model of the audio signal, given the first set of numbers.

7. The method according to claim 6 wherein the step of processing the first portion of the inter-sentence pause to obtain the first characterization of the first portion of the inter-sentence pause comprises the sub-steps of:

a) time domain sampling the inter-sentence pause to obtain a discretized representation of the inter-sentence pause that includes a sequence of samples;

b) time domain filtering the sequence of samples to obtain a filtered sequence of samples;

c) applying a window function to successive subsets of the filtered sequence of samples to obtain a sequence of frames of windowed filtered samples;

d) transforming each of the frames of windowed filtered samples to a frequency domain to obtain a plurality of frequency components;

e) taking a plurality of weighted sums of the plurality of frequency components to obtain a plurality of bandpass filtered outputs;

f) taking the log of the magnitude of each of the bandpass filtered outputs to obtain a plurality of log magnitude band pass filtered outputs; and g) transforming the plurality of log magnitude bandpass filtered outputs to a time domain to obtain at least a subset of the first set of numbers.

8. The method according to claim 7 wherein the step of processing the first portion of the inter-sentence pause to obtain the first characterization of the first portion of the inter-sentence pause further comprises the sub-steps of:

repeating sub-steps (a) through (g) for two portions obtained from at least one inter-sentence pause to obtain two sets of numbers; and taking the difference between corresponding numbers in the two sets of numbers to obtain at least a subset of the first set of numbers.

9. An automated speech recognition system comprising:

an audio signal input for inputting an audio signal that includes speech and background sounds;

a feature extractor coupled to the audio signal input for receiving the audio signal and outputting characterizations of a sequence of segments of the audio signal;

a model coupled to the feature extractor, wherein the model includes a plurality of states to which characterization of the sequence of segments are applied for evaluating a posteriori probabilities that one or more of the plurality of states occurred;

a search engine coupled to model for finding one or more high probability sequences of the plurality of states of the model;

a detector for detecting an absence of speech sounds of the audio signal and outputting a predetermined signal when the absence of speech sounds is detected; and a comparer and updater coupled to the detector for receiving the predetermined signal and in response thereto determines a mean of a multi component Gaussian mixture associated with background sounds that is closest to a feature vector that characterizes the audio signal during the absence of speech sounds, and updates the mean so that the mean is closer to the feature vector that characterizes the audio signal during the absence of speech sounds.

10. The automated speech recognition system according to claim 9 wherein:
- the feature extractor outputs characterizations for each of a succession of frames that include feature vectors that include cepstral coefficients;
- the model comprises a hidden marcov model that includes a plurality of emitting states and multi component Gaussian mixtures that give the a posteriori probability that a given feature vector is attributable to a given emitting state;
- the detector detects the absence of speech sounds by comparing a function of one or more cepstral coefficients to a threshold: and.

11. An automated speech recognition system comprising:
- an audio input for inputting an audio signal;
- an analog to digital converter coupled to the audio input for sampling the audio signal and outputting a discretized audio signal; and
- a microprocessor coupled to the analog to digital converter for receiving the discretized audio signal and executing a program for performing automated speech recognition, the program comprising programming instructions for:
- detecting an inter-sentence pause of an audio signal;
- processing a first portion of the inter-sentence pause to obtain a first characterization of the first portion of the inter-sentence pause;
- comparing the first characterization to a set of non-speech audio characterization to determine a particular non-speech audio characterization among the set of non-speech audio characterizations that most closely matches the first characterization; and
- updating the particular non-speech audio characterization so that the particular non-speech audio characterization more closely resembles the first characterization.

12. A computer readable medium storing programming instructions for performing automatic speech recognition in a variable background noise environment, including programming instructions for:
- detecting a plurality of inter-sentence pauses of an audio signal;
- processing a first portion of a first inter-sentence pause to obtain a first characterization of the first portion of the first inter-sentence pause;
- comparing the first characterization to a set of non-speech audio characterizations to determine a particular non-speech audio characterization among the set of non-speech audio characterizations that most closely matches the first characterization; and
- updating the particular non-speech audio so that the particular non-speech audio characterization more closely resembles the first characterization;
- processing one or more additional portions of the plurality of inter-sentence pauses to obtain one or more additional characterizations that characterize the one or more additional portions of the plurality of inter-sentence pauses;
- comparing the one or more additional characterizations to the set of reference characterization to find reference characterizations among the set of non-speech audio characterizations that most closely matches the one or more additional characterizations.

13. The computer readable medium according to claim 12 wherein:
- the programming instructions for processing the first portion of the first inter-sentence pause to obtain a first characterization include programming instructions for: processing the first portion of the first inter-sentence pause to obtain a first set of numbers that characterize the first portion of the first inter-sentence pause; and
- the programming instructions for comparing the first characterization to a set of non-speech audio characterizations comprises the programming instructions for:
- comparing the first set numbers to a plurality of non-speech audio sets of numbers to determining a particular set of non-speech audio numbers that most closely matches the first set of numbers.

14. The computer readable medium according to claim 13 wherein the programming instructions for updating the non-speech audio characterization comprising programming instructions for:
- replacing each number in the particular set of numbers with a weighted average of the number and a corresponding number in the first set of numbers.

15. The computer readable medium according to claim 14 wherein the programming instructions for comparing the first characterization to a set of non-speech audio characterizations comprise programming instructions for:
- taking a dot product between the first set of numbers and each of the plurality of non-speech audio sets of numbers.

16. The computer readable medium according to claim 15 wherein:
- the plurality of non-speech audio sets of numbers are means of components of Gaussian mixtures that characterize the probability of an underlying state of a hidden markov model of the audio signal, given the first set of numbers.

17. The computer readable medium according to claim 16 wherein the programming instructions for processing the first portion of the first inter-sentence pause to obtain the first characterization of the first portion of the first inter-sentence pause comprise the programming instruction, for:
a) time domain sampling the first inter-sentence pause to obtain a discretized representation of the audio signal that includes a sequence of samples;
b) time domain filtering the sequence of samples to obtain a filtered sequence of samples;
c) applying a window function to successive subsets of the filtered sequence of samples to obtain a sequence of frames of windowed filtered samples;
d) transforming each of the frames of windowed filtered samples to a frequency domain to obtain a plurality of frequency components;
e) taking a plurality of weighted sums of the plurality of frequency components to obtain a plurality of bandpass filtered outputs;
f) taking the log of the magnitude of each of the bandpass filtered outputs to obtain a plurality of log magnitude bandpass filtered outputs; and
g) transforming the plurality of log magnitude bandpass filtered outputs to a time domain to obtain at least a subset of the first set of numbers.

18. The computer readable medium according to claim 17 wherein the programming instructions for processing the first portion of the first inter-sentence pause to obtain the first characterization of the first portion of the first inter-sentence pause further comprises programming instructions for:
- applying programming instructions (a) through (g) to two portions of the first inter-sentence pause to obtain two sets of numbers; and
- taking the difference between corresponding numbers in the two sets of numbers to obtain at least a subset of the first set of numbers.

* * * * *